ent of timing, by the tare
weight, the weight of the beam, and the weight of the
container and its then contents, and at the instant of ter-
mination of timing, the fulcrum is loaded by the tare
weight and added weight, the beam weight, and the weight
of the container and its then increased contents. The
massiveness and the cost of construction of the balance
and the wear and amount of friction of the fulcrum vary
in accordance with the amount of loading of the bal-
ance, and accordingly a reduction in the loading will per-
mit a decrease in each of these factors and an increase
in the sensitivity of the balance. In the noted arrange-
ment, the loading of the fulcrum can be materially de-
creased only by decreasing the quantity of liquid which
is discharged into the container before and during the
timed interval. However, for a given rate of flow, any
reduction in the quantity of liquid discharged necessitates
a corresponding reduction in the timed interval and a
consequent increase in the effect of the timing errors
which arise, for example, from the inertia of the balance
or inaccuracies of the timing equipment. The reaching
of a satisfactory compromise between quantities of
weighed liquid and the length of the timed interval be-
comes more difficult with larger rates of flow, imposing
serious limitations on the maximum flow capabilities of
such equipments.

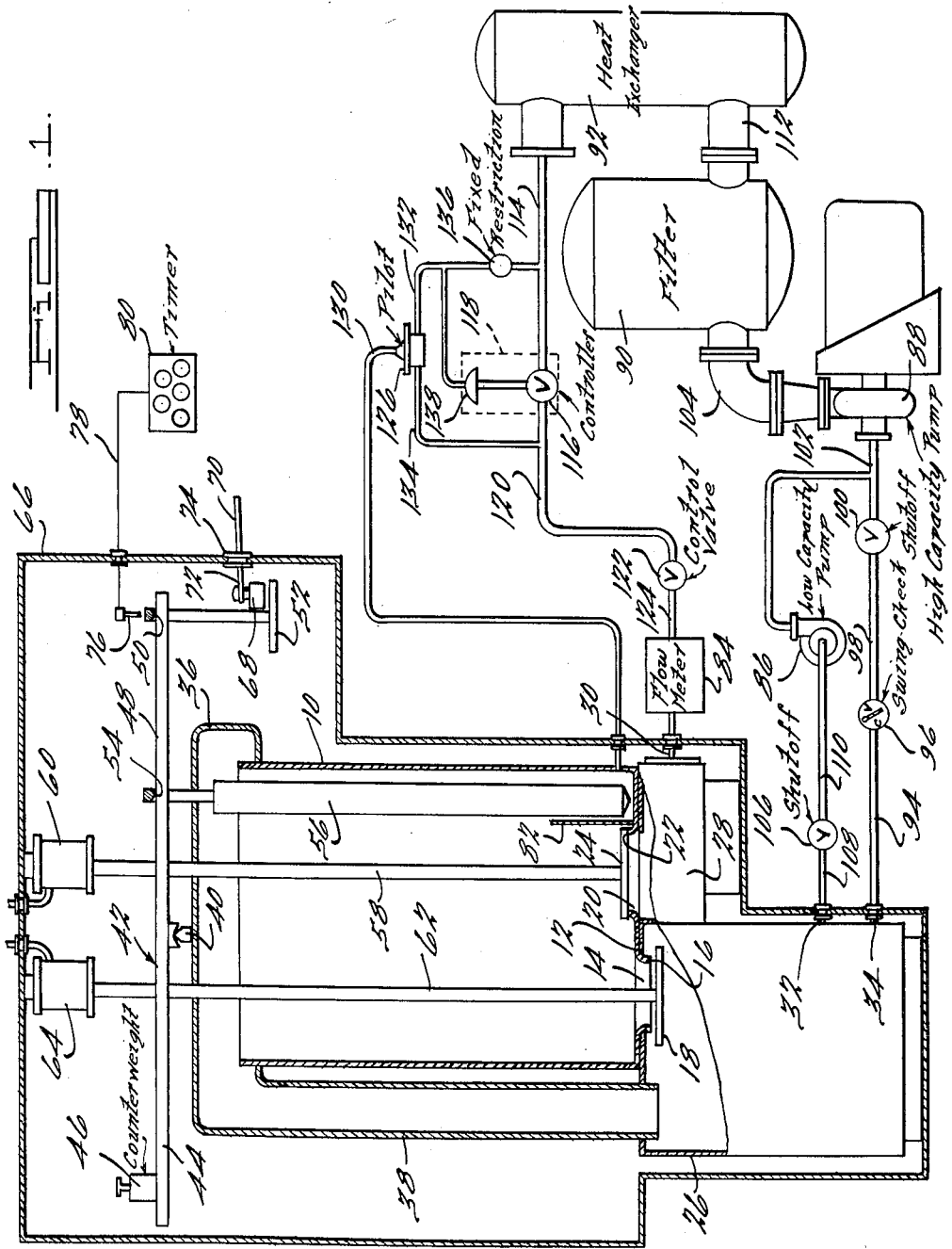

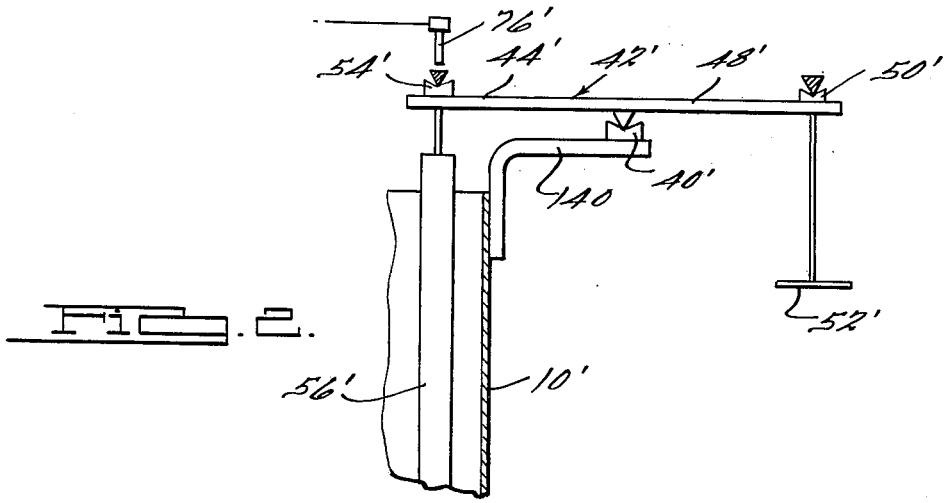
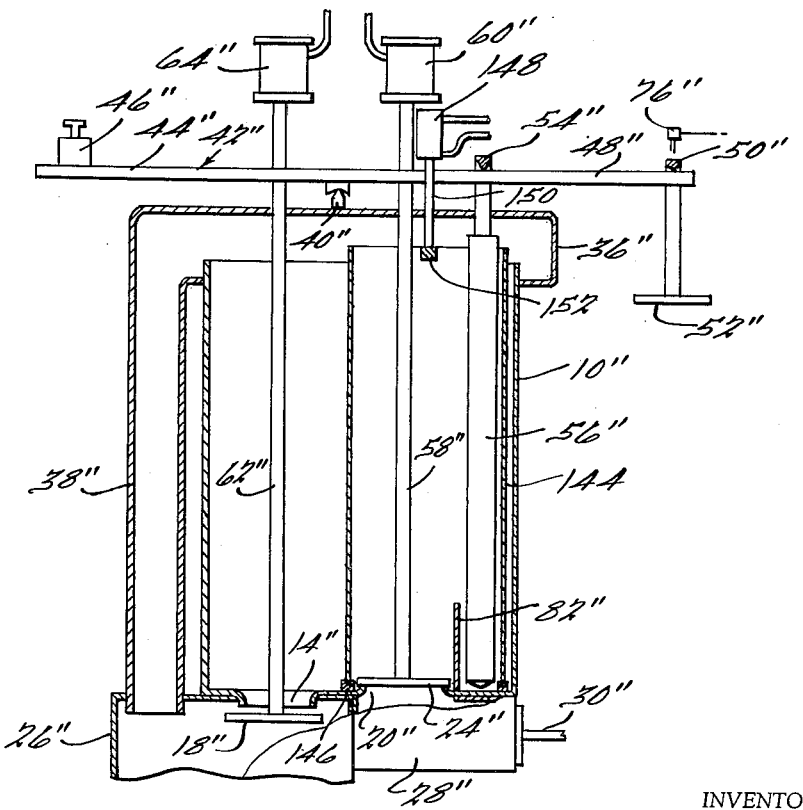

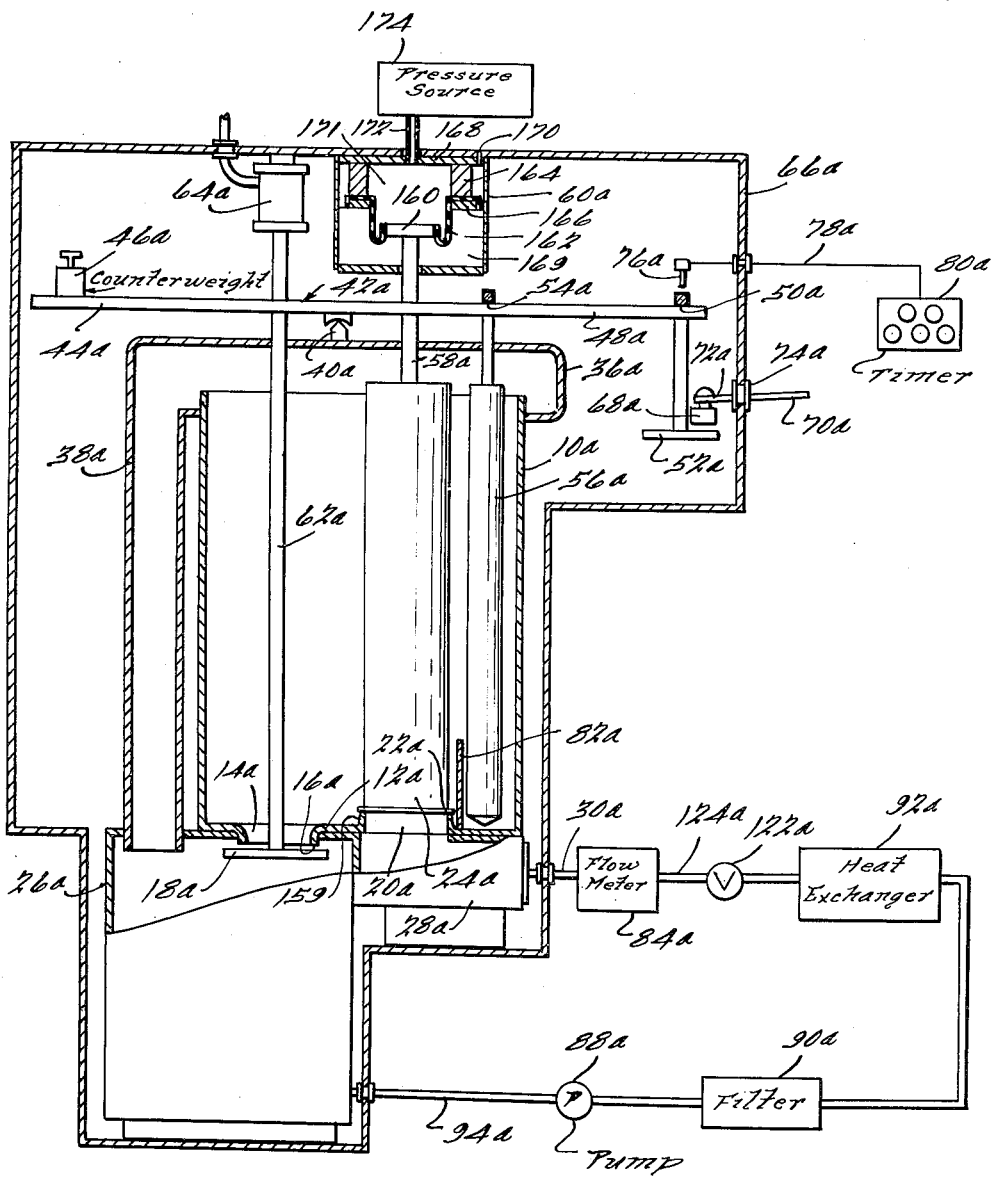

Accordingly, objects of the present invention are to
improve the precision and consistency of measurement
of liquid-flow measuring devices, to reduce the manufac-
turing and maintenance costs of such devices, and to in-
crease the range of rates of flow which can be accurately
measured.

In general, the principles of the present invention are
embodied in an arrangement in which the liquid from the
flowmeter under test is discharged into a fixed container
or tank. A buoy, supported by the beam of a balance,
is disposed within the tank in a position to become partial-
ly immersed in the inflowing liquid. When the liquid
in the tank has risen to a point to reduce the effective
weight of the buoy to a preselected value, as measured by
the balance, the movement of the beam of the balance
initiates timing. A weight difference is then established
at the balance (by adding or removing weights or by
shifting the distance between a weight and the fulcrum
of the balance) in a direction to lower the buoy in the
container, that is, in the direction of the previous inbal-
ance. When the fluid in the tank rises to the higher level
required to again shift the beam of the balance, timing
is terminated and the rate of flow of the liquid is
calculated.

In this fashion, the load on the fulcrum at balance can
be reduced to a small fraction of the loading which oc-
curred in the previously described arrangement, and the
equipment can be designed to measure extremely high
rates of flow without any necessary reduction of the timing
period and without excessive loading of the balance
through appropriate selection of the tank and buoy sizes.

A feature of this invention is an improved means for
preventing turbulence or high velocities of input flow in a
system of the noted nature from adversely affecting the
accuracy of measurement.

Another feature of this invention is a means for permit-
ting adjustment of the range of operation of such calibrat-
ing equipment.

Another feature of this invention is an arrangement for
adapting calibrating equipment of the noted nature to
the measurement of the rates of flow of pressurized
liquids.

A further feature of this invention is a system for
controlling the operation of a flowmeter calibrating equip-
ment and for insuring that the rate of flow of the equip-
ment through the flowmeter under test is not adversely
affected by the calibrating equipment.

The manner of accomplishing the foregoing objects,
the nature of the features of the present invention, and
other objects and features of the present invention will
be understood from the following detailed description of
embodiments of the invention when read with reference
to the accompanying drawings in which:

FIGURE 1 is a diagrammatic view of a calibrating
equipment embodying the principles of the present inven-
tion;

FIG. 2 is a fragmentary view of a calibrating equipment
modified to permit further reduction in the loading on the
fulcrum;

FIG. 3 is a fragmentary diagrammatic view of the
equipment of FIG. 1 modified to permit adjustment of the
range of operation of the unit; and FIG. 4 is a diagrammatic view of the equipment of
FIG. 1 further modified to provide simplified and im-
proved back pressure variation compensation.

The equipment illustrated in FIG. 1 of the drawings
comprises a calibrating tank 10 having an open upper
end and a closed bottom 12. An aperture 14 is formed
in the bottom of the tank 10, with the material adjacent
that aperture being flanged downwardly to define a valve
seat 16 for a valve head 18, and a second aperture 20
is formed in the bottom of the tank 10 spaced from the
aperture 14 and with the material of the bottom of the
tank flanged upwardly peripherally of the aperture 20 to
define a valve seat 22 cooperating with valve head 24.

Calibrating tank 10 surmounts a hollow supply tank
26 and a plenum chamber 28, plenum chamber 28 being
blocked from direct communication with supply tank 26.
The liquid being metered enters the plenum chamber 28
through input connection 30 in one end thereof and flows
into the calibrating tank 10 through aperture 20 and be-
tween the valve head 24 and the valve seat 22.

Supply tank 26 is provided with output connections 32
and 34 and is placed in communication with the interior
of calibrating tank 10 when valve head 18 is moved from
its seat 16. An overflow interconnection between cali-
brating tank 10 and supply tank 26 is established by
means of a cover 36 peripherally sealed to the calibrating tank 10 and connected to an overflow pipe 38 which extends downwardly parallel with the calibrating tank 10 and enters the supply tank 26 through an aperture in the upper wall thereof.

A fulcrum 40 is fixedly supported with respect to the calibrating tank 10 and is representatively illustrated as being mounted upon the top cover 36 thereof. A scale beam 42 is poised upon the fulcrum 40 and has a left-hand arm portion 44 supporting a counterweight 46 and a right-hand arm portion 48 supporting, through bearing 50, a weigh pan 52 and supporting, through bearing 54, a buoy 56. In the disclosed arrangement, the lever arm between fulcrum 40 and bearing 54 is shorter than the lever arm between fulcrum 40 and bearing 50.

Buoy 56 is preferably cylindrical and is illustrated as being circular cylindrical. The buoy is disposed within the tank 10 in a position in which its lower end approaches but normally does not engage the bottom 12 of the tank. Its length is greater than the maximum depth of the liquid which is flowed into the tank during the testing operation. The outer diameter of buoy 56 is small relative to the inner diameter of tank 10 as, for example, being a few inches in diameter relative to a calibrating tank diameter in the order of three feet or more in a unit adapted to measure relatively large rates of flow. Buoy 56 may be constructed of any suitable material which is not adversely affected by any of the liquids which are brought into contact therewith and having a specific gravity greater than one. Desirably, the buoy 56 should have an effective weight per unit length which is about twice the weight of the liquid which is displaced by that unit length. As the weight of the cylinder is increased beyond that point, the effect of the mass of the beam becomes more significant and the sensitivity of the calibrating equipment is reduced. In a preferred arrangement, buoy 56 was a metallic tube sealed at both ends.

The valve including valve head 24 and valve seat 22 serves as a back pressure valve and is controlled by means of a rod 58 connected to the head 24, and which passes through an aperture in the top cover 36, extends in spaced relation to the beam 42 and serves as or is connected to the piston rod of a cylinder 60.

The valve comprising valve head 18 and valve seat 16 serves as a dump valve and is controlled by means of a rod 62 connected to the head 18 and which extends through an aperture in the upper cover 36 and in spaced relation to the scale beam and serves as or is connected to the piston rod of a cylinder 64. Cylinders 60 and 64 are fixed with respect to the tank 10 in any suitable fashion as by being secured to the top wall of a sealed pressure vessel 66 which encloses and seals all of the equipment described to this point.

While the valves could be controlled by means such as solenoids if conditions permit, the disclosed equipment was designed to measure rates of flow of volatile and inflammable fuels and accordingly cylinders 60 and 64 are pneumatically or hydraulically actuated in the preferred arrangement.

In one mode of operation of the equipment of FIG. 1, it is necessary to place a weight 68 upon the weigh pan 52 during the course of the testing. If the system is pressurized by the provision of the vessel 66, then remote control means should be provided so that the placing or removing of the weight 68 from the weigh pan 52 can be controlled externally of the vessel 66. While hydraulic, pneumatic, or, with appropriate liquids, electrical means can be employed to perform this remote control function, the controlling device has representatively been illustrated as a rod 70 having a bifurcated end 72 adapted to engage the neck and to underlie the enlarged head of the weight 68. Rod 70 is pivotally and flexibly supported in the wall of the pressurizing vessel 66 by means of a grommet 74 and is preferably also slidable in a longitudinal sense within that grommet to permit full flexibility in the handling of the weight 68.

In one mode of operation of the equipment of FIG. 1, the weight 68 is initially spaced from the weigh pan 52 and supported by the rod 70. The counterweight 46 is selected in size and is positioned at a distance from the fulcrum 40 such that it does not fully counterbalance the arm 48 and its load when the tank 10 is empty. As a result, the system is out of balance.

With this condition existing and with the tank 10 empty, dump valve 18 is closed. The downward pressure exerted through rod 58 on valve head 24 is then adjusted to establish the desired back pressure. The inflowing liquid enters the plenum chamber 28 through the input port 30 and will, after filling the plenum chamber 28, enter the tank 10 through the aperture 20 and commence to fill that tank. When the liquid in the tank has risen to a preselected level, which is preferably but a relatively small portion of the depth of the tank, buoy 56 will displace a sufficient quantity of that liquid to reduce its effective weight to the point where the beam 42 comes to balance.

Timing should be initiated at this instant. While timing can be performed by an operator observing the beam 42 and employing a stop watch, an appreciably higher degree of accuracy can be achieved if automatic timing means are employed, and to this end, an electrical sensing device 76 is shown to be disposed above the end of the arm 48 of the beam 42 and in a position to be engaged by the end of that arm (or elements thereon) at the instant that the beam achieves balance or, if desired, at a point in the movement of the beam prior to or beyond the exact point of balance. Element 76 is connected by means of a cable 78 to an electrical timer 80. Timer 80 should have the required degree of precision and, with the disclosed arrangement, should be responsive to a first signal via cable 78 to initiate timing and to continue timing until a second signal is received via that cable.

After the beam reaches balance and timing has been initiated, the weight 68 is placed upon the weigh pan 52 while the inflow of liquid continues. This will again bring the system to imbalance, releasing the sensing device 76. The inflow will then continue until the liquid level in the tank 10 has risen to the point where the amount of that liquid displaced by the buoy 56 is sufficient to reduce the effective weight of the buoy to the point where balance is again achieved. When this occurs, the right-hand end of arm 48 of beam 42 will again rise to actuate device 76 to terminate the operation of timer 80. The inflow of liquid may then be terminated, the test being complete except for calculations. The tank 10 is then emptied by opening dump valve 18 and the weight 68 is removed from the weigh pan 52 in preparation for the next test.

In the described procedure, the balance is first unbalanced in one direction, with its arm 48 lower than its arm 44, that the system is brought to balance by the buoyant effect of the liquid upon cylinder 56, and that the balance is then again unbalanced in the same direction and is thereafter again brought to balance as a result of an increased buoyant effect upon the cylinder 56. As an alternative procedure, rather than placing a weight 68 upon the weigh pan 52 at the instant timing is initiated, the counterweight 46, or less than all of a plurality of counterweights 46, can be removed (by remote control equipment if the pressurizing vessel 66 is provided) to accomplish the same result with a further reduction in the loading of the fulcrum 40.

It will be observed that the input aperture 20 in the tank 10 is spaced from the buoy 56 so that the stream of inflowing liquid will not normally directly impinge upon the buoy 56. However, to insure that the momentum and/or turbulence of the input liquid flow will not have any substantial impact effect upon the buoy 56 and hence upon the balance, and to disperse any velocity head and insure a uniform rise of the liquid in the tank, a baffle 82 is preferably fixed to the bottom 12 of the tank 10 in a position to shield the buoy 56 from the input stream.

In the preferred arrangement, baffle 82 is in the form of a plate disposed between the buoy 56 and the port 20. Since the plate does not extend from wall to wall of the tank 10, liquid level adjacent the buoy 56 will be equal to the liquid level at other points in the tank 10.

As previously stated, the equipment thus far described is particularly suited to the calibrating of various forms of flow-metering devices and, particularly, impeller types of flowmeters which are available on the open market. The system for producing the requisite liquid flow through the flowmeter 84 under test includes, in the illustrated arrangement, low and high capacity pumps 86 and 88, a filter 90, a heat exchanger 92 and various control valves. Liquid is drawn from the supply tank 26 through output port 32 by low capacity pump 86 or through output port 34 by high capacity pump 88. If the high capacity pump 88 is placed into operation, the liquid from the supply tank 26 flows through the output connection 34, through pipe 94, swing check valve 96, pipe 98, manual shutoff valve 100 (which is open), pipe 102, and through pump 88 to pipe 104, some liquid also flowing through the idle low capacity pump if shutoff valve 106 is open. Conversely, if the low capacity pump 86 is placed in operation, pump 88 is not operated. Liquid from the supply tank 26 then flows through output connection 32, pipe 108, valve 106, pipe 110, low capacity pump 86, pipe 102, through the now static high capacity pump 88 and to pipe 104, return flow being prevented by the swing check valve 96 if valve 100 is open.

In either case, the liquid in pipe 104 flows through a filter 90 which serves to remove foreign solids which might interfere with the operation of the equipment and of the operation of the flowmeter 84, and through pipe 112 to the heat exchanger 92. Heat exchanger 92 serves to control the temperature of the liquid and normally comprises a tank containing a series of coolant-carrying tubes so as to reduce the temperature of the liquid. However, it will be appreciated that heat exchanger 92 may be employed to elevate the temperature of the liquid if it is desired to calibrate the flowmeter 84 for high temperature liquids.

The liquid leaves the heat exchanger 92 via pipe 114, and passes through a valve 116 which is an element of a controller 118, through pipe 120, manual control valve 122, pipe 124, and through the flowmeter 84 to the input connection 30. The valve comprising head 24 and seat 22 in the calibrating equipment serves to establish a pressure drop thereacross which is reflected as a back pressure to the flowmeter 84 to prevent cavitation and to insure proper operation of the flowmeter 84. Other means may be employed, if desired, for establishing this back pressure as, for example, by disposing the flowmeter upstream of valve 122 or just upstream of valve 116.

As the calibrating tank 10 fills, the head will increase and the magnitude of the back pressure upon the flowmeter 84 will increase, resulting in a reduction of the pressure drop across flowmeter 84 and a reduction in the pressure drop across the control valve 122, and thereby producing a reduction in the rate of flow. In order to maintain a constant flow rate for improved calibration accuracy, means are provided for increasing the upstream pressure in accordance with the increase in back pressure so as to maintain the pressure drops across the flowmeter 84 under test and across the control valve 122 constant. This means comprises the controller 118 which adjusts the upstream pressure and the pilot valve 126 for continuously sensing the effective magnitude of the back pressure. These elements have not been illustrated in detail since suitable forms thereof are well known and commercially available.

Pilot 126 comprises a flow-controlling valve controlled by a diaphragm which is responsive to the pressure of a liquid applied thereto through pipe 130. Pipe 130 extends through an aperture in the wall of the pressurizing vessel 66 and through the side wall of the calibrating tank 10 at a point near the bottom thereof. Accordingly, the pressure of the liquid applied to the diaphragm of pilot valve 126 varies in accordance with the magnitude of the head of the liquid in calibrating tank 10. As that head and the pressure at the diaphragm of the pilot valve 126 increases, the pilot valve 126 correspondingly opens to increase the rate of flow of liquid from pipe 132 to pipe 134. Pipe 132 is connected to pipe 114 through a fixed restriction 136 and pipe 134 is connected to pipe 120. The pressure of the liquid in pipe 132 is sensed by the pressure responsive element 138 of the controller 118, that element, in common commercial practice, again being a diaphragm or equivalent means. Pressure responsive element 138 controls the valve 116 of the controller 118, a reduction in the pressure applied to element 138 resulting in a corresponding opening of the valve 116, and an increase in pressure upon the element 138 resulting in a corresponding closing of the valve 116.

As the head in the calibrating tank 10 increases, valve 126 opens correspondingly to increase the fluid flow from pipe 114 through pipes 132 and 134, producing a correspondingly increased pressure drop across the fixed restriction 136 and a corresponding reduction in the pressure of the liquid in pipe 132. This reduction in pressure in pipe 132, as applied to the pressure responsive element 138 of controller 118, results in a corresponding opening of valve 116, tending to produce an increase in the rate of liquid flow from pipe 114 to pipe 120 through valve 116. However, this tendency toward increased flow exactly compensates for the reduction in the pressure difference between pipe 114 and input pipe 30 resulting from the increase of head in tank 10, so that the rate of liquid flow from pipe 114, through controller valve 116, through pipe 120, through control valve 122, through pipe 124, and through the flowmeter 84 remains constant despite the increase in head in the calibrating tank 10. Otherwise stated, the total pressure drop between pipe 114 and input connection 30 appears (apart from pressure drops in the pipes) across valve 116, valve 122, and the flowmeter 84. As the pressure difference between pipe 114 and input connection 30 decreases due to the rise in head in tank 10, valve 116 is opened so that the pressure drop across that valve is decreased correspondingly so as to maintain the pressure drop across valve 122 and across the flowmeter 84 constant. A constant fluid pressure drop across control valve 122 and flowmeter 84 signifies a constant rate of fluid flow through those elements.

It will be appreciated that the amount of liquid which is bled through pipes 132 and 134 is so minute relative to the primary flow through pipes 114 and 120 as not to affect the uniformity of the rate of primary flow with changes in the head in tank 10.

FIG. 2 of the drawings represents a modified construction which is or may be identical to the structure of FIG. 1 in all portions thereof not specifically shown in the fragmentary view of FIG. 2. In this modified arrangement, the fulcrum 40' of the balance is mounted upon a bracket 140 secured to the wall of the calibrating tank 10'. Beam 42', pivoted at fulcrum 40', has an arm 44' which supports, through the medium of bearing 54', the buoy 56', and an arm 48' which supports, through bearing 50', the weigh pan 52'. The sensing device 76' for sensing the changes of position of the beam 42' is shown to be disposed in sensing relationship with elements of the bearing 54'.

In the use of the equipment illustrated in FIG. 2 of the drawings, a weight is placed upon weigh pan 52' which is not sufficiently heavy to counterbalance buoy 56' when the tank 10' is empty of liquid. As liquid is flowed into the tank 10', cylinder 56' is buoyed to the point where beam 42' is brought into balance. This condition is sensed by device 76' to initiate timing. Thereafter, the weight (or a portion thereof) is removed from the weigh pan 52' to again shift the beam 42' to imbalance in the original direction. When sufficient additional liquid has been flowed into the tank 10' to buoy the cylinder 56' sufficiently to again bring the beam 42' to balance, sensing device 76' is actuated to terminate the timing operation. With this modified arrangement, the fulcrum 40' is loaded, at the instant of the initiation of timing, by an amount (assuming for simplicity, equal lever arms) equal to twice the weight of the weigh pan or tare weight plus the weight of the beam 42'. At the instant of the termination of timing, the fulcrum 40' is loaded to a lesser degree.

It will be apparent in this modification that if the effective density of the cylinder 56' is greater than the density of the liquid being flowed, some weight will have to be left upon the weigh pan 52' (again assuming equal lever arms) after timing is initiated.

FIG. 3 discloses a modified arrangement in which means are provided for shifting the measuring capacity of the unit to a major degree so that the unit will have the capability of accurately measuring large rates of flow when necessary and yet be capable of measuring lower rates of flow with equal accuracy. If a tank of the type shown in FIG. 1 is of proper size to measure with the requisite accuracy relatively low rates of flow, the accuracy of measurement will tend to be reduced at higher rates of flow since the timing period becomes shorter, and conversely, if the tank is large enough to properly measure relatively large rates of flow, the timing period for the lower rates of flow becomes excessively long. In the arrangement of FIG. 3, the range of the unit can be shifted so that approximately the same length of time will elapse between the initiation and termination of timing with a relatively low rate of flow as will elapse with a relatively high rate of flow.

Except for modifications to be described, the apparatus of FIG. 3 is or may be identical to the apparatus of FIG. 1 and corresponding parts have been designated with corresponding reference numerals suffixed by a double-prime symbol.

In the modified arrangement, a low range calibrating tube 144 is disposed within the tank 10" and in surrounding relation with the buoy 56" and the input aperture 20". Tube 144 is open at its top while its lower edge engages an annular seat 146 mounted upon the bottom of tank 10". Tube 144 is movable between the illustrated seated position and a raised position under the control of device 148 which can be a hydraulic or pneumatic cylinder or a solenoid serving to move a rod 150 in a vertical sense. Rod 150 is secured to a bracket 152 which extends diametrically of the tube 144 and is secured thereto. A spider or other similar perforate device can alternatively be employed for interconnecting the rod 150 and the tube 144. Rod 150 extends through an aperture in the cover 36" and is spaced from the beam 42" so as not to interfere with the operation thereof. Device 148 is fixed with respect to the tank 10" in any suitable fashion.

With the tube 144 in its seated position, as illustrated, the inflowing liquid will fill only the cavity defined by the tube 144 so that, for any given rate of flow, the rate of liquid rise will be greater than it would be were the tube 144 not present. The system otherwise operates as above described, with the diameter of the tube 144 being selected to provide an appropriate interval between the point of initiation of timing and the point of termination of timing for a selected range of rates of liquid flow. At the termination of the measuring operation, the liquid is released from tube 144 by actuating device 148 to raise tube 144 from its seat 146 and by opening dump valve 18". It will be perceived that dump valve 18" can, if desired, be left opened throughout the measuring operation.

To measure a higher range of rates of liquid flow, device 148 is actuated to lift tube 144 from its seat 146 and the equipment is then operated identically to the equipment of FIG. 1.

It is also contemplated that a plurality of tubes similar to tube 144 of progressively increasing sizes could be provided to provide a plurality of measuring ranges if desired. It is also contemplated that the tube 144 could be shaped and arranged so as not to surround the input aperture 20", a separate input aperture and controlling valve therefor being provided for that tube. In that case, when the tube is lifted from its seat for measurement in the high rate-of-flow range, the tube will also serve as a baffle for the buoy.

While the illustrated use of vertically movable tubes for shifting the range of operation of the apparatus is preferred, it will be appreciated that an object of appropriate size and weighing more than an equivalent volume of liquid could be lowered into the tank of FIG. 1 to decrease the effective volume of that tank by a known amount so as to provide for a lower range of rates of liquid flow.

It was found that over a range of flows from about 300 pounds of liquid per hour to over 4,000 pounds per hour, a constructed embodiment of the invention even without the use of the range adjusting means of FIG. 3 was accurate to within about 0.2% and that the variation between repetitive runs at the same rate of flow was less than about 0.1%.

In the apparatus and system illustrated in FIG. 4 of the drawings, the back pressure variation compensating equipment illustrated in FIG. 1 of the drawings is omitted and other means are provided for accomplishing such compensation. In the system of FIG. 4, the valve head 24a for the back pressure valve is, instead of a disc-like member as shown in FIG. 1, an elongated member. Valve head 24a serves as a buoy. Its length is greater than the maximum depth of the liquid which is flowed into the tank during the test operation. For best compensation, the major portion of the valve head should have a uniform cross-sectional area equal to the cross-sectional area of the port 20a. To that end, the valve head 24a has been illustrated as having small flange 159 at the bottom to insure proper alignment and engagement with the valve seat 22a. The valve head 24a is illustrated as being of approximately the same length as that of buoy 56a and as being circular cylindrical. The density of the valve head 24a is not critical. Since a buoying effect will be experienced by a cylinder substantially greater in density than that of the liquid, the valve head may, if desired, be several or many times as dense as that liquid. Conversely, if means including pressure source 174 are provided for exerting a downward force upon the valve head, the valve head itself may in fact have a density less than that of the liquid.

The upper end of valve head 24a is connected by a valve stem 58a to a plate 160. A flexible diaphragm 162 extends between the plate 160 and interconnected peripheral clamping members 164 and 166. Member 164 is secured to the upper plate 168 of the housing 60a which is in turn supported by vessel 66a. The cavity 169 within the housing 60a below the diaphragm 162 is or may be vented to the atmosphere by a vent 170, in which case cavity 169 is preferably sealed from communication with the interior of vessel 66a, while the cavity 171 within housing 60a above diaphragm 162 is connected by a hose or pipe 172 to a pressure source 174.

The liquid is drawn from the supply tank 26a via the output pipe 94a which is connected to a pump 88a. If desired, a low capacity pump and a high capacity pump may be employed alternatively as is illustrated in FIG. 1 of the drawings. The output of pump 88a and applied through a filter 90a to a heat exchanger 92a and the output of heat exchanger 92a is passed through a control valve 122a and via pipe 124a to a flowmeter 84a or other device under test or calibration. The output of the flowmeter 84a is connected via a pipe 30a to the plenum chamber 28a. The port 20a between plenum chamber 28a and the volume within the calibrating tank 10a is controlled by the valve head 24a in cooperation with the valve seat 22a.

The initial downward force of the valve head 24a upon the valve seat 22a is determined by a number of factors, including the selected pressure applied from pressure source 174 to volume 171 and the weight of the valve head 24a. These factors contribute to the establishment of a fluid back pressure for the flowmeter 84a.

As previously noted, as the calibrating tank 10a fills, the head will increase and the magnitude of the back pressure upon the flowmeter 84a will tend to increase, resulting in a reduction of the pressure drop across the flowmeter 84a and across the control valve 122a and thereby producing a reduction in the rate of flow. However, in the arrangement of FIG. 4, the formation of the valve head 24a as an enlarged body compensates for this tendency. Thus, as the liquid level rises, the buoying of the valve head 24a reduces the effective weight of that valve head and hence reduces the total exerted downward force, thereby tending to reduce the back pressure. The rate at which the buoying of the valve head 24a tends to reduce the back pressure matches the rate at which the back pressure tends to increase due to the increasing volume of liquid within the tank 10 and consequently the effective back pressure exerted upon the flowmeter 84a remains constant.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. The method of measuring the rate of flow of liquid into a tank of known size containing an elongated member which is heavier than the liquid which it displaces and which is supported within but spaced from the walls and bottom of the tank by a balance which is unbalanced as a result of the weight of the member comprising the steps of flowing liquid into the tank until the balance reaches balance as a result of the buoyant effect upon the member of the liquid as it rises in the tank, initiating timing, adjusting the load on the balance to unbalance the balance in the initial direction, continuing to flow liquid into the tank until the balance again reaches balance, and terminating timing.

2. Apparatus for calibrating a flowmetering device comprising a tank having a wall and a bottom, a balance having two arms, an elongated member supported by one arm of said balance in a position within but spaced from the wall and bottom of said tank, means including said member for unbalancing said balance in the direction of said member, a source of liquid, means for flowing liquid from said source through the flowmetering device and into said tank, timing means, means effective when said balance reaches balance as a result of the buoyant effect of the liquid on said member for actuating said timing means, and means effective after said balance has been again unbalanced in said direction and when said balance again reaches balance for deactuating said timing means.

3. Apparatus for calibrating a flowmetering device comprising a tank having a wall, a bottom and a liquid-input port, a balance having two arms, an elongated member supported by one arm of said balance in a position within but spaced from the wall and bottom of said tank, a source of liquid, means for flowing liquid from said source through the flowmetering device and into said tank, and liquid flow controlling means disposed downstream of the flowmetering device for establishing a back pressure for the device comprising an input valve at said tank.

4. Apparatus for calibrating a flowmetering device comprising a tank having a wall, a bottom and a liquid-input port, a balance having two arms, an elongated member supported by one arm of said balance in a position within but spaced from the wall and bottom of said tank, a source of liquid, means for flowing liquid from said source through the flowmetering device and into said tank, and liquid flow controlling means disposed downstream of the flowmetering device for establishing a back pressure for the device.

5. The combination of claim 4 further including a pressurizing vessel surrounding and enclosing said tank and said member.

6. The combination of claim 4 in which said member is circular cylindrical and has a length greater than the depth of the tank.

7. The combination of claim 4 further including baffle means disposed within said tank and between said port and said member.

8. The combination of claim 4 further including means responsive to the varying depth of the liquid in said tank for maintaining a liquid-pressure differential across the device which is independent of variations of said depth of said liquid.

9. The combination of claim 4 further including means for reducing the effective volume of said tank into which the liquid is flowed.

10. The combination of claim 4 further including tube means disposed in said tank and surrounding said member and said port for reducing the effective volume of said tank into which liquid is flowed.

11. The combination of claim 10 further including a seat for the bottom end of said tube mounted on the bottom of said tank and sealing the interior of said tube from the remaining volume of said tank.

12. The combination of claim 11 further including means for selectively raising said tube from said seat.

13. Apparatus for calibrating a flowmetering device comprising a tank having a wall, a bottom and a liquid-input port, a balance having two arms, an elongated buoy supported by one arm of said balance in a position within but spaced from the wall of said tank, means for flowing liquid through the flowmetering device and into said tank through said port, and means for compensating for variations in the back pressure exerted on the device due to the increase in liquid level in the tank.

14. Apparatus for calibrating a flowmetering device comprising a tank having a wall, a bottom and a liquid-input port, a balance having two arms, an elongated buoy supported by one arm of said balance in a position within but spaced from the wall of said tank, means for flowing liquid through the flowmetering device and into said tank through said port, and means for compensating for variations in the back pressure exerted on the device due to the increase in liquid level in the tank comprising an elongated valve head in cooperating relationship with said liquid-input port and buoyable by the liquid in said tank.

15. Apparatus for calibrating a flowmetering device comprising a tank having a wall, a bottom and a liquid-input port, a balance having two arms, an elongated buoy supported by one arm of said balance in a position within but spaced from the wall of said tank, means for flowing liquid through the flowmetering device and into said tank through said port, and means for compensating for variations in the back pressure exerted on the device due to the increase in liquid level in the tank comprising an elongated valve head in cooperating relationship with said liquid-input port and buoyable by the liquid in said tank in proportion to the level of the liquid in said tank.

16. Apparatus for calibrating a flowmetering device comprising a tank having a wall, a bottom and a liquid-input port, a balance having two arms, an elongated buoy supported by one arm of said balance in a position within but spaced from the wall of said tank, means for flowing liquid through the flowmetering device and into said tank through said port, and means for compensating for variations in the back pressure exerted on the device due to the increase in liquid level in the tank comprising an elongated valve head in cooperating relationship with said liquid-input port and buoyable by the liquid in said tank and having a uniform cross-sectional area and a length greater than the maximum depth of the liquid which is flowed into said tank during the testing operation.

17. The combination of claim 16 in which the area of said valve head over the major portion of its length is equal to the cross-sectional area of said port.

18. Apparatus for calibrating a flowmetering device comprising a tank having a wall, a bottom and a liquid-input port, a balance having two arms, an elongated buoy supported by one arm of said balance in a position within but spaced from the wall of said tank, means for flowing liquid through the flowmetering device and into said tank through said port, and means for compensating for variations in the back pressure exerted on the device due to the increase in liquid level in the tank comprising an elongated valve head in cooperating relationship with said liquid-input port and buoyable by the liquid in said tank and means additional to the weight of said valve head for exerting a force tending to move said valve head into engagement with said input port.

19. Apparatus for calibrating a flowmetering device comprising a tank having a wall, a bottom and a liquid-input port, a balance having two arms, an elongated buoy supported by one arm of said balance in a position within but spaced from the wall of said tank, means for flowing liquid through the flowmetering device and into said tank through said port, and means for compensating for variations in the back pressure exerted on the device due to the increase in liquid level in the tank comprising an elongated valve head in cooperating relationship with said liquid-input port and buoyable by the liquid in said tank and means additional to the weight of said valve head for exerting a force tending to move said valve head into engagement with said input port comprising means including fluid pressure means exerting a downward force on said valve head.

References Cited in the file of this patent

UNITED STATES PATENTS

| | | |
|---|---|---|
| 2,291,678 | Benz | Aug. 4, 1942 |
| 2,342,696 | Rover | Feb. 29, 1944 |
| 2,614,578 | Stickney | Oct. 21, 1952 |
| 2,778,218 | Sault | Jan. 22, 1957 |
| 2,876,639 | Loizzo et al. | Mar. 10, 1959 |